(12) United States Patent
Lippitt et al.

(10) Patent No.: US 10,148,483 B1
(45) Date of Patent: Dec. 4, 2018

(54) DYNAMIC FRONT END CONNECTIVITY OPTIMIZATIONS

(71) Applicant: EMC IP Holding Company LLC, Hopkinton, MA (US)

(72) Inventors: Mark C. Lippitt, Westborough, MA (US); Erik Smith, Douglas, MA (US); Marik Marshak, Newton, MA (US); Michael J. Scharland, Franklin, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 214 days.

(21) Appl. No.: 14/870,718

(22) Filed: Sep. 30, 2015

(51) Int. Cl.
| | | |
|---|---|---|
| *H04L 12/24* | (2006.01) | |
| *H04L 12/26* | (2006.01) | |
| *H04L 29/08* | (2006.01) | |
| *H04L 12/911* | (2013.01) | |
| *H04L 12/935* | (2013.01) | |

(52) U.S. Cl.
CPC .............. *H04L 41/04* (2013.01); *H04L 43/16* (2013.01); *H04L 47/70* (2013.01); *H04L 49/30* (2013.01); *H04L 67/1097* (2013.01)

(58) Field of Classification Search
CPC ............... H04L 29/08072; H04L 43/00; H04L 12/2602; H04L 41/22; H04L 29/06; H04L 29/06027; H04L 29/06326; H04L 12/66; H04M 7/006
USPC ......................................................... 709/224
See application file for complete search history.

(56) References Cited

U.S. PATENT DOCUMENTS

| | | | | |
|---|---|---|---|---|
| 7,289,493 | B1 * | 10/2007 | Vera ..................... | H04M 7/0057 370/352 |
| 8,838,931 | B1 * | 9/2014 | Marshak ............... | G06F 3/0605 710/74 |
| 2005/0172084 | A1 * | 8/2005 | Jeddeloh ............. | G06F 13/1642 711/154 |
| 2005/0278494 | A1 * | 12/2005 | Hillier, III .......... | G06F 11/1666 711/162 |
| 2006/0080477 | A1 * | 4/2006 | Seigneret ................ | G06F 13/28 710/22 |

(Continued)

OTHER PUBLICATIONS

Brass Tracks, "Introducing Target Driven Zoning (TDZ)," Jan. 16, 2012, 10 pps.

*Primary Examiner* — Mahran Y Abu Roumi
(74) *Attorney, Agent, or Firm* — Muirhead and Saturnelli, LLC

(57) ABSTRACT

Described are techniques for determining connectivity. Statistics are received regarding components of the data storage system including any of a target port, a front end adapter, and a device. It is determined in accordance with inputs whether to modify existing connectivity between an initiator set of one or more initiators and a target set of one or more target ports of the data storage system. The inputs include the one or more statistics and one or more adjustment criteria. Responsive to determining to modify the existing connectivity, first processing makes modification(s) to the existing connectivity including any of: modifying an access state associated with a target port over which a device is exposed to an initiator, and adding or removing connectivity between the initiator and another target port of the data storage system where a device is exposed to the initiator over the another target port.

19 Claims, 10 Drawing Sheets

(56) References Cited

U.S. PATENT DOCUMENTS

| | | | | |
|---|---|---|---|---|
| 2009/0182836 A1* | 7/2009 | Aviles | ................ | H04L 41/0893 |
| | | | | 709/213 |
| 2010/0223404 A1* | 9/2010 | Butler | ................ | H04L 41/0806 |
| | | | | 710/38 |
| 2015/0007188 A1* | 1/2015 | Sutanto | ................ | G06F 9/4881 |
| | | | | 718/104 |
| 2015/0288585 A1* | 10/2015 | Brown | ................ | H04L 67/1097 |
| | | | | 709/224 |

* cited by examiner

DYNAMIC FRONT END CONNECTIVITY OPTIMIZATIONS

BACKGROUND

Technical Field

This application generally relates to data storage and determining connectivity information between a client and a data storage system.

Description of Related Art

Data storage systems may include resources used by one or more host systems. Data storage systems and host systems may be interconnected by one or more communication connections such as in a network. These resources may include, for example, data storage devices such as those included in the data storage systems manufactured by EMC Corporation. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of the invention is a method of determining connectivity comprising: receiving one or more statistics regarding one or more components of a data storage system, said one or more components including any of a target port, a front end adapter, and a device; determining, in accordance with a set of inputs, whether to modify existing connectivity between an initiator set of one or more initiators and a target set of one or more target ports of the data storage system, the set of inputs including the one or more statistics and one or more adjustment criteria; and responsive to determining to modify the existing connectivity between the initiator set and the target set, performing first processing to make one or more modifications to the existing connectivity between the initiator set and the target set, wherein the one or more modifications include any of: modifying a state associated with a first target port of the target set over which a first device is exposed to a first initiator, and adding or removing connectivity between the first initiator and another target port of the data storage system where a device is exposed to the first initiator over the another target port. The one or more modifications may include modifying the state associated with the first target port of the target set over which the first device is exposed to the first initiator. The state may be modified from a first state to a resulting state, wherein the first state indicates that read and write I/Os that are directed to the first device and are sent by the first initiator to the first target port are serviced and wherein the resulting state indicates that read and write I/Os that are directed to the first device and are sent by the first initiator to the first target port are not serviced. The state may be modified from a first state to a resulting state, wherein the first state indicates that read and write I/Os that are directed to the first device and are sent by the first initiator to the first target port are not serviced and wherein the resulting state indicates that read and write I/Os that are directed to the first device and are sent by the first initiator to the first target port are serviced. The one or more modification may include adding the connectivity between the first initiator and the another target port of the data storage system where the device is exposed to the first initiator over the another target port. The one or more modification may include setting a second state associated with the another target port over which the device is exposed to the first initiator, wherein the second state indicates whether or not read and write I/Os that are directed to the device and are sent by the first initiator to the another target port are serviced. The first processing may add the connectivity between the first initiator and the another target port over which the first device is exposed by communicating with any of a network fabric and connectivity fabric of a first component external to the data storage system and using masking information of the data storage system, the masking information including information indicating that the first device is exposed to the first initiator over the another target port. The first processing may include adding the first initiator to a storage group including the first device exposed over the another target port, wherein said adding updates the masking information to indicate that the first device is exposed over the another target port to the first initiator; and issuing a request to the first component in accordance with the masking information that creates a new zone including the first initiator and the another target port. The adding may be performed using data storage management software of the data storage system and wherein the another target port may issue the request that creates the new zone. The second state may be set by the data storage system and may affect whether or not the data storage system services read and write I/Os that are directed to the device and received by the another target port from the first initiator. The set of statistics may include at least one statistic regarding any of workload and performance of the one or more components. The one or more adjustment criteria may include any of: a minimum performance threshold, a maximum workload threshold, one or more rebalancing criteria identifying conditions when workload is considered unbalanced in the data storage system whereby redistribution of workload is performed, and a planned or scheduled activity or event in the data storage system requiring redistribution of workload. The one or more adjustment criteria may indicate to modify the existing connectivity if any of: an observed performance value indicates current performance is less than a minimum performance threshold, an observed workload is more than the maximum workload threshold, the one or more rebalancing criteria indicates workload is currently unbalanced and needs redistribution, a predicted performance value indicates that predicted performance is less than the minimum performance threshold, a predicted workload is more than the maximum workload threshold, and the one or more rebalancing criteria indicates predicted workload for the one or more components is unbalanced and needs redistribution. A first of the one or more statistics may denote any of an observed workload value and an observed performance value for a first of the one or more components. Determining whether to modify existing connectivity may include any of modeling and predicting the first statistic regarding the first component to determine a first predicted value, wherein said determining may use the first statistic and the first predicted value in connection with the one or more adjustment criteria to determine whether to modify existing connectivity. Determining may include performing anomaly detection to determine whether any of: a change between two consecutive observed values for one of the statistics and a change between the first statistic and the first predicted value is an anomaly that should be ignored. The set of inputs may include information regarding any of detected trends and patterns regarding any of workload and performance for the one or more components, an activity history regarding any of workload and performance for the one or more components, and a minimum event duration time. The target set may include a plurality of target ports and wherein the data storage system may include a plurality of front end adapters each including one or more of the target ports. The method may include determining a plurality of predicted workloads for any of the plurality of target ports and the plurality of front end adapters, wherein the plurality of predicted workloads are determined using inputs including a plurality of current workloads for the any of the plurality of target ports and the plurality of front end adapters, wherein the one or more adjustment criteria include one or more rebalancing criteria and the one or more inputs include the plurality of predicted workloads. Determining whether to modify the existing connectivity may include determining whether workload distribution in the data storage system is balanced using the one or more rebalancing criteria and any of the plurality of predicted workloads and the plurality of current workloads. Determining whether to modify the existing connectivity may include determining that at least one of the plurality of target ports and the plurality of front end adapters each have an associated workload exceeding a specified maximum threshold; and determining that workload capacity of the existing connectivity needs to be increased. The first processing may include adding other connectivity to the existing connectivity, wherein said adding may further include adding at least one target port to the target set by creating one or more new zones each including at least one initiator of the initiator set, each of said one or new zones being created by the data storage system automatically issuing requests to a network fabric and connectivity fabric.

In accordance with another aspect of the invention is a system comprising: a processor; and a memory including code stored thereon that, when executed, performs a method of determining connectivity comprising: receiving one or more statistics regarding one or more components of a data storage system, said one or more components including any of a target port, a front end adapter, and a device; determining, in accordance with a set of inputs, whether to modify existing connectivity between an initiator set of one or more initiators and a target set of one or more target ports of the data storage system, the set of inputs including the one or more statistics and one or more adjustment criteria; and responsive to determining to modify the existing connectivity between the initiator set and the target set, performing first processing to make one or more modifications to the existing connectivity between the initiator set and the target set, wherein the one or more modifications include any of: modifying a state associated with a first target port of the target set over which a first device is exposed to a first initiator, and adding or removing connectivity between the first initiator and another target port of the data storage system where a device is exposed to the first initiator over the another target port.

In accordance with another aspect of the invention is a computer readable medium comprising code stored thereon that, when executed, performs a method of determining connectivity comprising: receiving one or more statistics regarding one or more components of a data storage system, said one or more components including any of a target port, a front end adapter, and a device; determining, in accordance with a set of inputs, whether to modify existing connectivity between an initiator set of one or more initiators and a target set of one or more target ports of the data storage system, the set of inputs including the one or more statistics and one or more adjustment criteria; and responsive to determining to modify the existing connectivity between the initiator set and the target set, performing first processing to make one or more modifications to the existing connectivity between the initiator set and the target set, wherein the one or more modifications include any of: modifying a state associated with a first target port of the target set over which a first device is exposed to a first initiator, and adding or removing connectivity between the first initiator and another target port of the data storage system where a device is exposed to the first initiator over the another target port.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
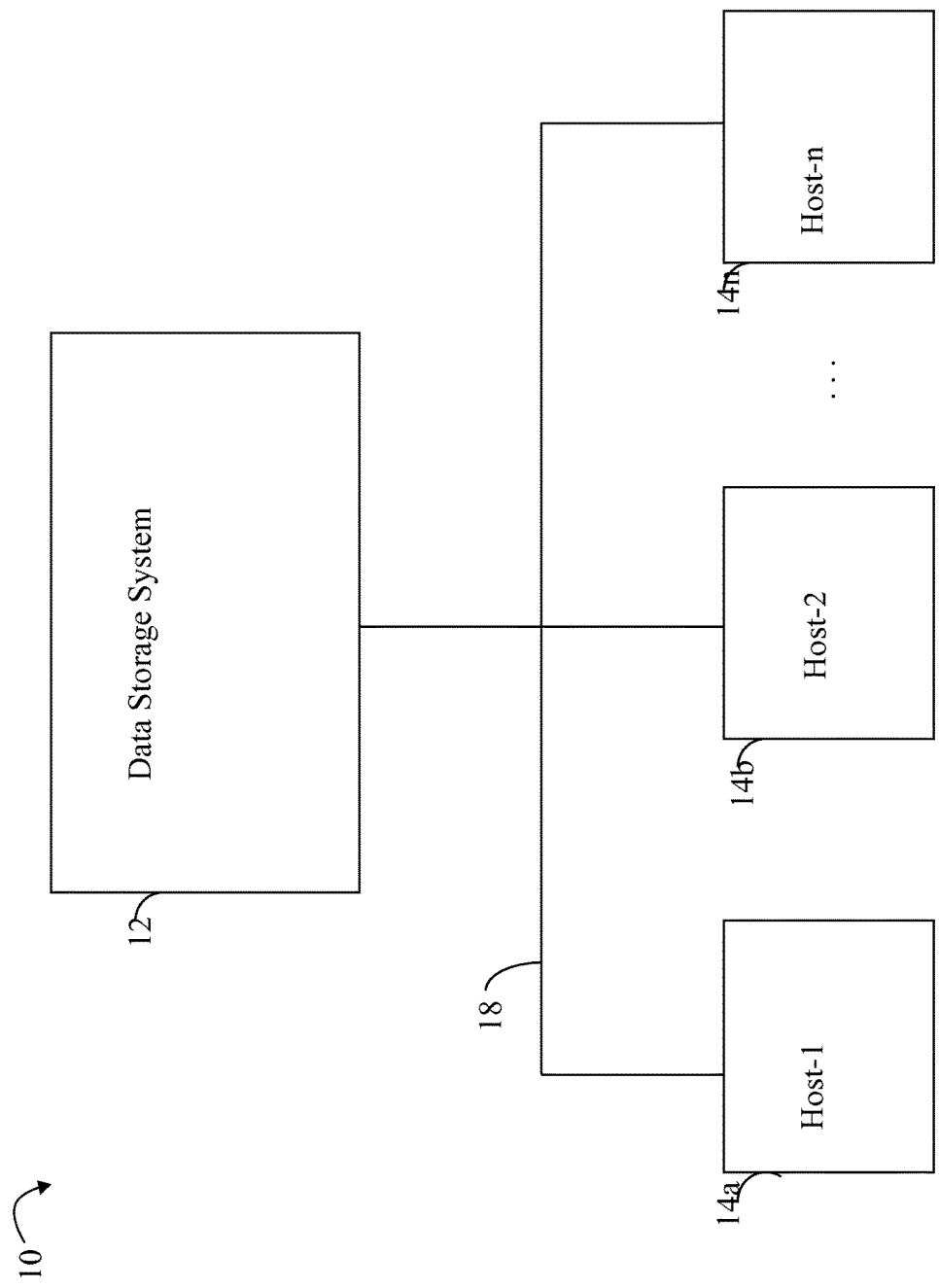
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix® VMAX® data storage system, as well one or more other data storage systems as may vary with the embodiment.

Figure 2A:
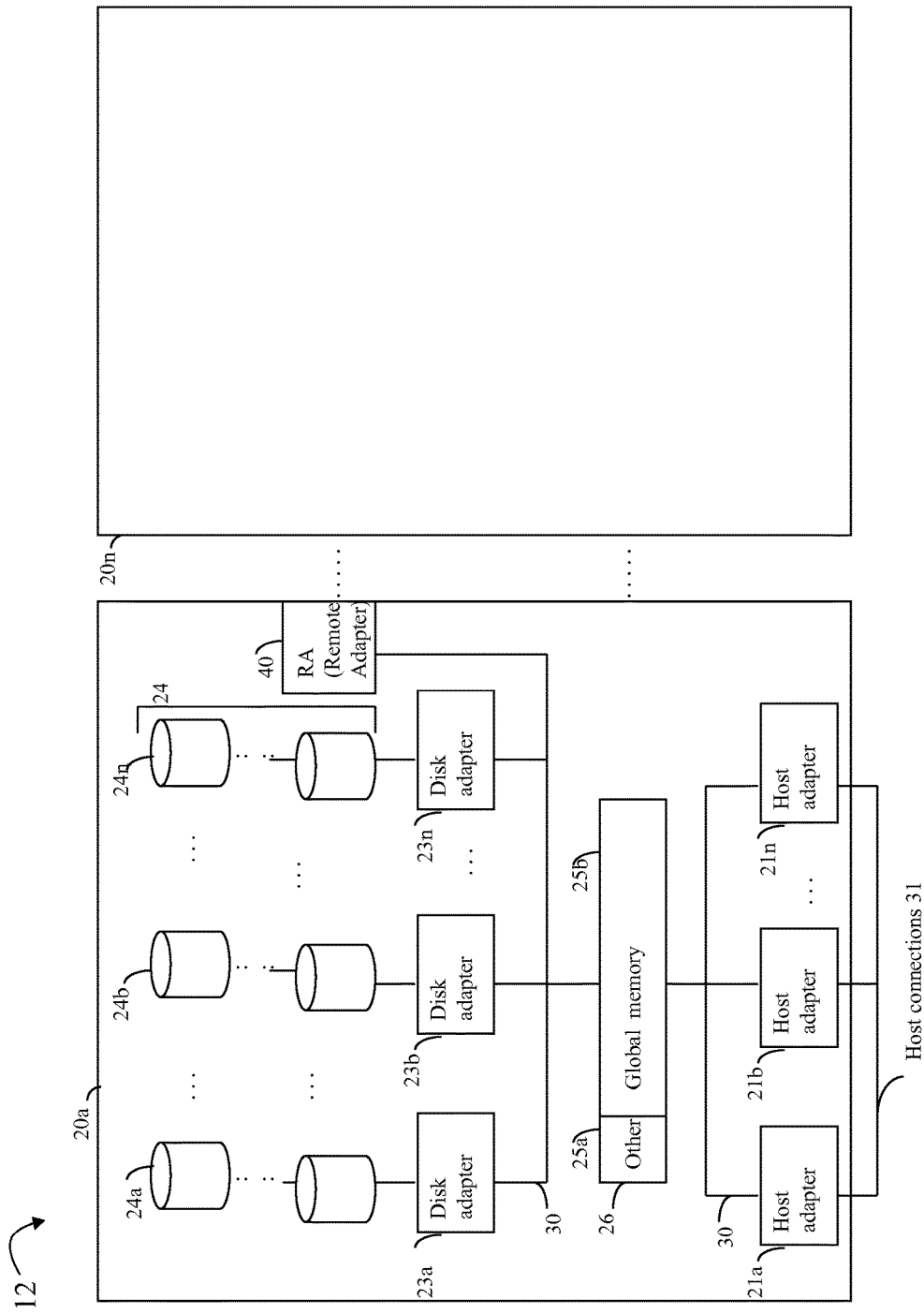
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by EMC Corporation, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems such as by EMC Corporation, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate.

It should also be noted that a DA may also be a controller providing access to external physical drives or storage devices located on one or more external data storage systems rather than local physical drives located in the same physical storage system as the DA (such as illustrated in FIG. 2A).

Figure 2B:
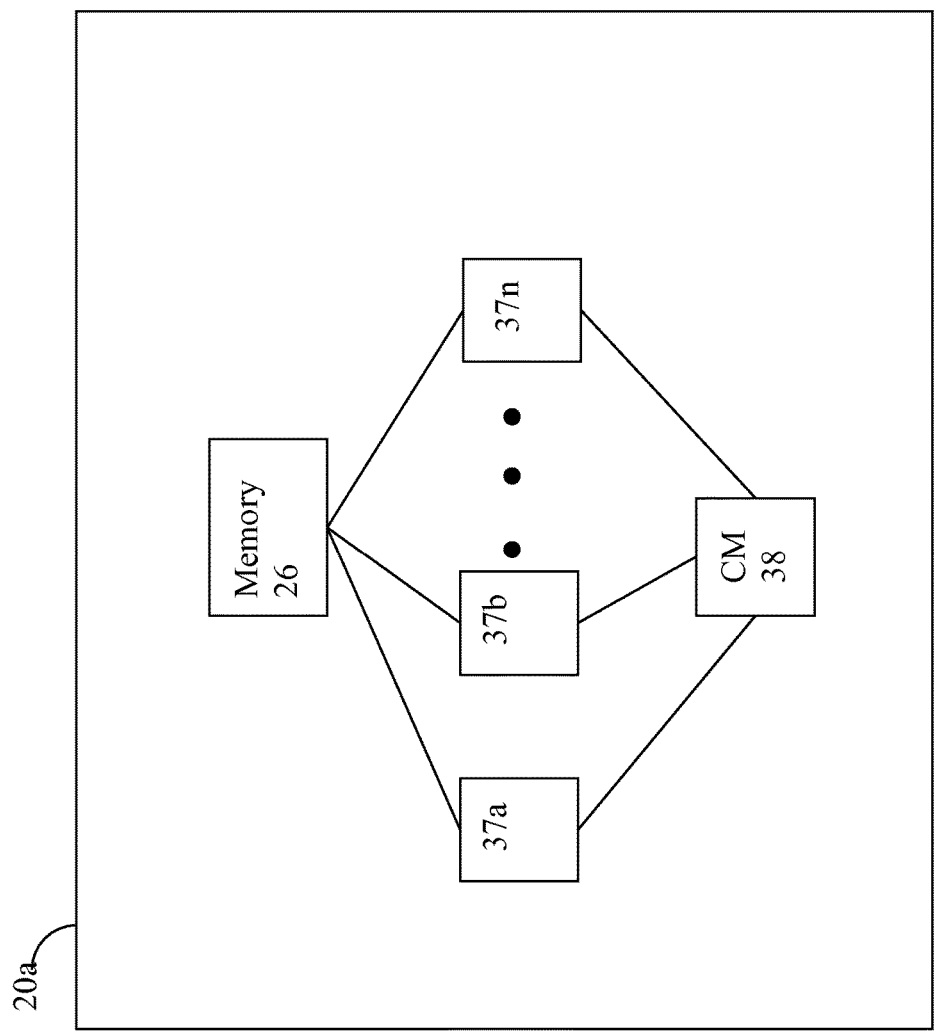
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
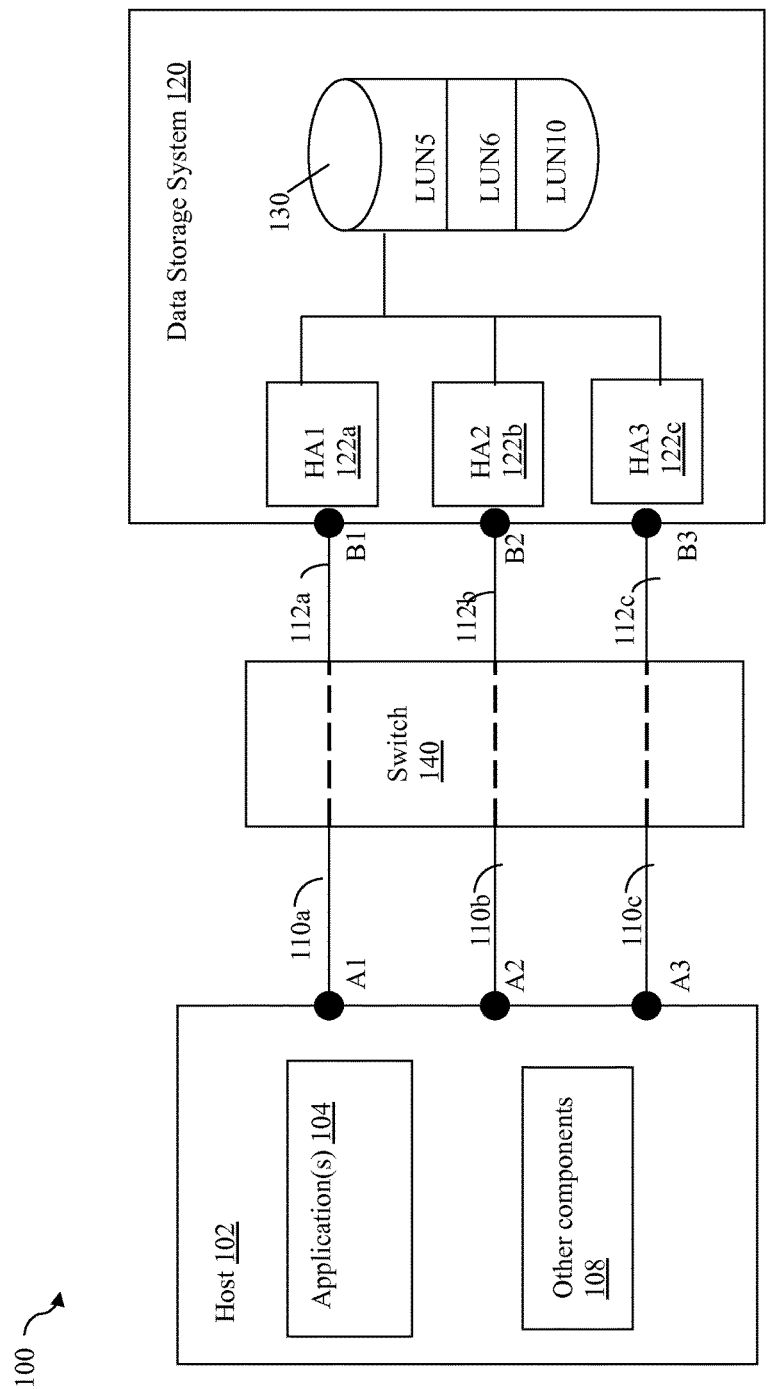
FIGS. 3 and 8 are examples of systems and components that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based or other solid state storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

It should be noted that following paragraphs and examples may refer to a particular examples using switch 140 having a switching fabric for simplicity of illustration, element 140 may be a single switch having a switching fabric, a multi-switch having a multi-switch fabric and the like. Thus, element 140 may more generally denote a network having its own connectivity fabric or network fabric where the network may include one or more components providing the connectivity between the host 102 and data storage system 120.

The host 102 may include one or more applications 104 and other components 108 whereby element 108 may include, for example, one or more other device drivers and other code. An I/O operation from the application 104 may be communicated to the data storage system 120 using one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over one or more physical paths. As such, each of the I/O operations may be forwarded from the application 104 to the data storage system 120 over one of the possible multiple paths.

The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
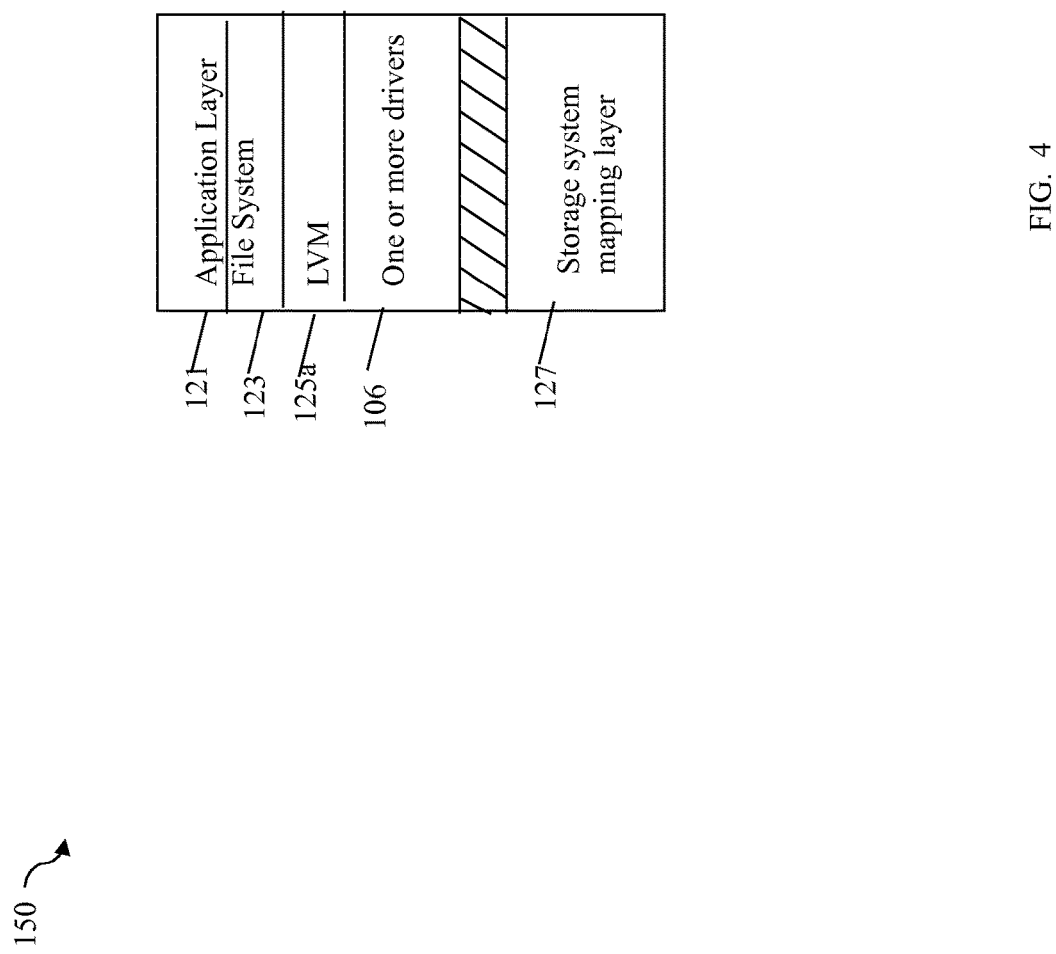
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with performing a data operation request issued by a host to a data storage system such as illustrated in FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be one or more drivers 106 which handle processing of the I/O received from layer 125a. The one or more drivers represented by 106 may include, for example, a SCSI driver (e.g., performs processing for sending requests and receiving responses in accordance with the SCSI standard), a hardware driver (e.g., a driver for an HBA of the host which sends commands or requests to the data storage system and also receives responses and other communications from the data storage system), and the like. Generally, one or more layers between the application layer 121 and the one or more drivers 106 may provide for mapping a LUN (such as used in connection with block-based storage)

presented by the data storage system to the host to another logical data storage entity, such as a file, that may be used by the application layer 121.

In some embodiments, the data storage system 120 of FIG. 3 may be an intelligent data storage system having its own mapping layer 127 such that the LUN known or exposed to the host may not directly correspond to a physical device such as a disk drive. In such embodiments, the LUN specified by the host in the command associated with the I/O operation may be further mapped by the data storage system using its mapping layer 127. For example, a LUN specified by the host may be mapped by the data storage system to one or more physical drives, multiple LUNs may be located on a same physical device, multiple physical drives, and the like. In other embodiments, the data storage system may not include such a mapping layer 127.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the drivers 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

Masking may be generally characterized as a process performed on the data storage system that indicates which of the LUNs are exposed over which target ports to which initiators. For example target port B1 may be configured to have 100 LUNs attached or mapped to it where the 100 attached LUNs may be potentially exposed to any initiator. The masking information (also referred to herein as mask information or LUN mask information) provides the HAs and their target ports information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

Data storage systems may connect to hundreds of hosts over multiple paths. In a data storage system not in accordance with techniques herein, the decision of which initiator to map to which one or more ports (over which LUNs are exposed) may be manual. Monitoring load and other indicators of the data storage system front end components (e.g., front end adapters and target ports thereof) may also be performed in order to assist in determining whether any changes to existing connectivity between the data storage systems and hosts are needed. Results of such monitoring may be provided to a user to once again decide what, if any, desired changes should be made to existing connectivity where any such changes may also be implemented manually such as through a user interacting with the switching fabric, or more generally network fabric, and issuing requests to change the existing connectivity.

Described in following paragraphs are techniques that may be used in an embodiment to provide automatic load balancing as may be performed by an optimization tool that decides what, if any, changes are needed to existing connectivity between data storage systems and hosts. Such techniques provide for automatically redistributing load across or among target ports and front end adapters (e.g., data storage system front end components) as may be needed responsive to automatic monitoring of the current and/or predicted workload and performance of data storage system components and/or devices (e.g., LUNs). Such techniques provide for dynamic relocation or redistribution of workload among or across different data storage system front end components such as by changing access states on the data storage system with respect to the various target ports over which LUNs are accessible to the host initiators. Techniques herein provide for automatically creating, modifying and/or replacing zoning information of the switching fabric such as using target driven zoning (TDZ), as described in more detail below. In one aspect, each HA or front end component, and target port thereof, may be characterized as having a maximum workload capacity (e.g., such as expressed in terms of IOPS (I/Os per second), MBps (megabytes per second), and the like) which may be distributed or balanced in connection with techniques described herein in more detail.

It should be noted that in following paragraphs, described is a technique using TDZ with FC/FCoE (Fibre channel over Ethernet) fabrics. However, as will be appreciated by those skilled in the art, a similar approach may be used in connection with other network fabrics such as an embodiment using SCSI in an Ethernet LAN.

In SAN, zoning is the allocation of resources for device load balancing and for selectively allowing access to data only to certain users. Essentially, zoning allows an administrator to control who (e.g., which initiator(s)) can see what target ports in a SAN. Using TDZ in combination with LUN masking as described herein provides control over who (e.g., what initiator(s)) can see what data/devices (e.g., LUNs) over which target ports in a SAN. Zoning is generally known in the art. Zones may be created by grouping world wide port names (WWPNs) of host interfaces (e.g., initiators) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric (e.g., via RSCN or registered state change notification in FC protol) and can perform processing to discover the zoning changes and log into the switch to establish any new connections.

Thus, zoning may be generally characterized as defining logical connections between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric. For example, referring again to FIG. 3, assume for illustration purposes that initiator port A3 is only zoned to target port B3 whereby LUNs 5, 6 and 10 are exposed to A3 only over target port B3 (and not exposed through target ports B1 and B2). Also assume that initiator port A2 is similarly zoned only to target port B3 whereby LUNs 5, 6 and 10 are exposed to A2 only over target port B3 (and not exposed through target ports B1 and B2). Assume further that A1 is not included in any zone and therefore has no connectivity to the data storage system 120 and currently target ports B1 and B2 are not zoned. Thus, all I/Os and other commands directed to LUNs 5, 6 and 10 from A2 and A3 flow only through target port B3.

Processing may be performed to monitor the workload of B3. Such workload may be expressed in terms of any suitable metric, measurement or statistic. For example, such workload may be expressed in terms of observed I/O throughput (e.g., I/Os per second or IOPS) and/or data throughput (e.g., Mbytes per second or MBps). Each target port may have a specified maximum workload capacity denoting the maximum amount of load the target port is capable of handling. Such maximum workload capacity may denote 100% utilization of the target port. A workload threshold may be specified denoting an upper bound for the observed workload for the target port where it may be desirable, on average over time, to keep the observed workload of a target port below the specified workload threshold. The workload threshold may be an acceptable or desirable upper limit that is less than the specified maximum workload capacity. For example, the workload threshold may be some percentage (e.g. 70%) of the maximum workload capacity.

If the observed workload of the target port reaches or exceeds the workload threshold, the target port may be characterized as overloaded. It should be noted that in a similar manner, values for maximum workload capacity (=100% utilization), observed workload, and workload threshold may be specified for other target ports as well as for each front end adapter such as each HA 122a-122c of FIG. 3.

Continuing with the example, in response to detecting the observed workload of the target port B3 exceeding the workload threshold, processing may be performed to redistribute the workload. This redistribution may be accomplished, for example, by shifting a portion of the workload currently flowing through B3 to another target port having available bandwidth. For example, since both the workload of A2 and A3 flow through only target port B3, an option is to redistribute the workload of one of the initiators A2 or A3 to another target port, such as B1 or B2 having available bandwidth (e.g., which may have a current observed workload that is well below its associated workload threshold). In a system not using these techniques, one way in which this redistribution may be accomplished is by first manually issuing commands to the switch fabric to modify the existing zoning information and then manually modifying masking information. For example, as a first step, request(s) may be issued to the switching fabric to modify existing zoning information of the switch so that A2 is zoned to B1 having available bandwidth, rather than B3. The foregoing first step creates the new logical connection between A2 and B1 and removes the logical connection between A2 and B3. The second step may include modifying the masking information on the data storage system to indicate that LUNs 5, 6 and 10 are now exposed to A2 over only target port B1.

Rather than manually perform the foregoing two steps, an embodiment in accordance with techniques herein may simply modify or update the masking information on the data storage system to indicate that LUNs 5, 6 and 10 are now exposed to A2 over only target port B1 and then use TDZ whereby the data storage system automatically issues requests to the switching fabric to automatically share the updated masking information with the switch and make the appropriate modifications to zoning information based on the updated masking information. Put another way, the masking modification may be performed on the data storage system and, in response to such masking modifications, the data storage system (e.g., such as using an optimization tool performing techniques herein) automatically communicates with SAN fabric services to implement required zoning changes and thus modify existing connectivity information.

With TDZ as noted above, generally target ports of the data storage system share masking information with the switching fabric/network fabric and then the switch performs processing to create necessary changes to the zoning information. As described elsewhere herein, masking information specifies which initiators have access to which LUNs over which target ports of the data storage system 120. The masking information identifying which initiators have access to which LUNs on which target ports may be entered using data storage management software used to manage the data storage system. For example, such masking information may be entered via a defined management interface such as a GUI, CLI, and the like, as may be supported in an embodiment. In one embodiment, each initiator may have an associated WWPN and the masking information identifies which initiator WWPNs are allowed to access particular LUNs on each target port of the data storage system. In such an embodiment, a storage group may be defined using the management software where the storage group includes one or more LUNs each of which is mapped or exposed through one or more target ports. In such an embodiment, an initiator may be associated with such a defined storage group using the management software. The foregoing host-storage group association may define the masking information used with TDZ where the host is identified as having access to the storage group (e.g., to the one or more LUNs through one or more target ports). Thus, in at least the foregoing embodiment, creating the masking information does not require any manual user interaction with the switching fabric and may be performed in an automated manner using software of the data storage system.

In an embodiment in accordance with techniques herein, the optimization tool described in more detail throughout, may perform processing to assess whether workload of the target port B3 is overloaded and thus requires a redistribution of the workload. The optimization tool may further determine that the workload redistribution may be accomplished by modifying the existing zoning information as described above. The optimization tool may then automatically interact with the data storage system management software or other means to accordingly update the masking information.

Once the masking information has been modified, such as using the optimization tool interacting with the data storage system management software, the data storage system may then automatically communicate with the switching fabric to effectively provide the masking information to the switching fabric by issuing commands to the fabric to set up the appropriate zones and/or zoning modifications to allow appropriate access as specified in the masking information. In one embodiment, the storage port(s) associated with the storage group may issue such commands, such as commands to add the appropriate zones to the fabric. The target ports of the storage group may use, for example, the AAPZ (add/replace active peer zone) request or command to add the appropriate peer zones to the fabric. In at least one embodiment, the optimization tool may interact with target ports or other software that causes or instructs the target ports to issue the particular commands needed to implement the zoning changes in accordance with the modified masking information.

In such an embodiment, TDZ may be used to issue commands to modify zoning information. For example, TDZ may be used to issue commands to the fabric where such commands perform operations with respect to a peer zone. In connection with and continuing with the above example, a peer zone may be created by a target port, such as B1, which names the target port as the principal and includes the initiator(s) (such as A2 in this example) allowed to access LUN(s) through the target port as zone members (e.g., the peers of the zone). With a peer zone, the members are allowed to communicate with the principal but not with other peers of the zone. The AAPZ and other commands as may be issued to switching fabric are known in the art. In response to receiving the AAPZ request, the switch may accept the AAPZ request, update the zoning information of the fabric, and then notifies each affected peer zone member—each initiator of a host—of the new or updated zoning information. Such notification to each initiator may be, for example, a Registered State Change Notification (RSCN) message which is part of the existing Fibre Channel protocol known in the art.

In response to receiving the RSCN, a host initiator of the peer zone may perform discovery processing whereby, for example, the host issues commands or requests to the switching fabric to obtain the changes. For example, assume the RSCN is generated responsive to an AAPZ request defining a new peer zone with a new target port that the initiator may communicate with. In this case, discovery processing as performed by the host initiator may result in discovering this new target port and the initiator may then take steps to log into the switch and enable communications between the initiator and the newly discovered target port.

Thus, an embodiment in accordance with techniques herein may use TDZ to have the data storage system target ports automatically create or replace one or more zones based on masking information of the data storage system. As such, TDZ is one technique that may be used to automate modification of zoning information by having the data storage system automatically perform processing to implement zoning modifications that reflect the connectivity update made to masking information using the data storage management software.

In an embodiment described herein, the data storage systems may be SCSI-based systems, such as a group of SCSI-based data storage arrays. An embodiment in accordance with techniques herein may include hosts and data storage systems which operate in accordance with the standard SCSI Asymmetrical Logical Unit Access (ALUA). The ALUA standard as defined in T10/SPC-4 specifies a mechanism for asymmetric or symmetric access of a logical unit. ALUA allows the data storage system to set a LUN's access state with respect to a particular initiator port and the target port. Thus, in accordance with the ALUA standard, various access states may be associated with a path with respect to a particular device, such as a LUN. In particular, the ALUA standard defines such access states including the active-optimized, active-non optimized, and unavailable states as described herein. A recognized path (such as recognized by a host) over which I/Os (e.g., read and write I/Os) may be issued to access data of a LUN may have an "active" state, such as active-optimized. Active-optimized is an active path to a LUN that is preferred over any other path for the LUN having an active-non optimized state. A recognized path over which I/Os may not be issued to access data of a LUN may have an "unavailable" state. When a path to a LUN is in the unavailable state, a limited set of non-I/O-based commands (e.g. other than read and write commands to, respectively, read and write user data), such as the SCSI INQUIRY, may be issued. It should be noted that such limited set of non I/O based commands may also be issued over an active (e.g., active optimized and active non-optimized) path as well.

In accordance with the ALUA or other suitable standard, there may be other possible path access states with respect to a visible or exposed LUN as well as variations to the active state, such as active-optimized and active-non-optimized. However, for purposes of techniques herein, the path access state of active may be generally any type of active state or variation whereby that active state indicates that I/Os (e.g., reads and writes) may be issued to the LUN over the path. The active state of a path with respect to a LUN indicates that I/O operations (e.g., reads and writes) sent on the path which are directed to the LUN are serviced. In contrast, the unavailable state of a path with respect to a LUN indicates that I/O operations (e.g., reads and writes) sent over the path which are directed to the LUN are not serviced thereby result in an error status or condition. In the active and unavailable states, non I/O or control commands that are directed to the LUN may be sent over the path. It should be noted that in an embodiment described herein in accordance with the ALUA standard, the ALUA standard defined states of active and unavailable may map to the active and unavailable states described herein. Other standards that may be used in other embodiment may have similar concepts and states which may be mapped and used to represent the active and unavailable states described in connection with techniques herein.

As described in following paragraphs, a data storage system in accordance with techniques herein may set an access path state for a particular LUN to active-optimized (also referred to herein as simply "optimized") to denote that the I/Os directed to the LUN sent over the particular path from the initiator to the target port will be serviced by the data storage system. The data storage system in an embodiment in accordance with techniques described herein may set an access path state for a particular LUN to unavailable to denote that the I/Os directed to the LUN sent over the particular path from the initiator to the target port will not be serviced by the data storage system. Thus, multipathing software on the host may monitor the particular access path state as may be set by the data storage system with respect to a particular LUN to determine which path to select for sending I/Os to a LUN. Thus, when the LUN is exposed to a host initiator over multiple paths (e.g., where the same LUN is accessible through multiple different target ports of the data storage system), the data storage system may vary the associated access state of each such path in order to vary and control the particular ones of the multiple paths over which I/O may be issued to the LUN. Use of such access state changes in connection with techniques herein is described in more detail below.

Figure 5:
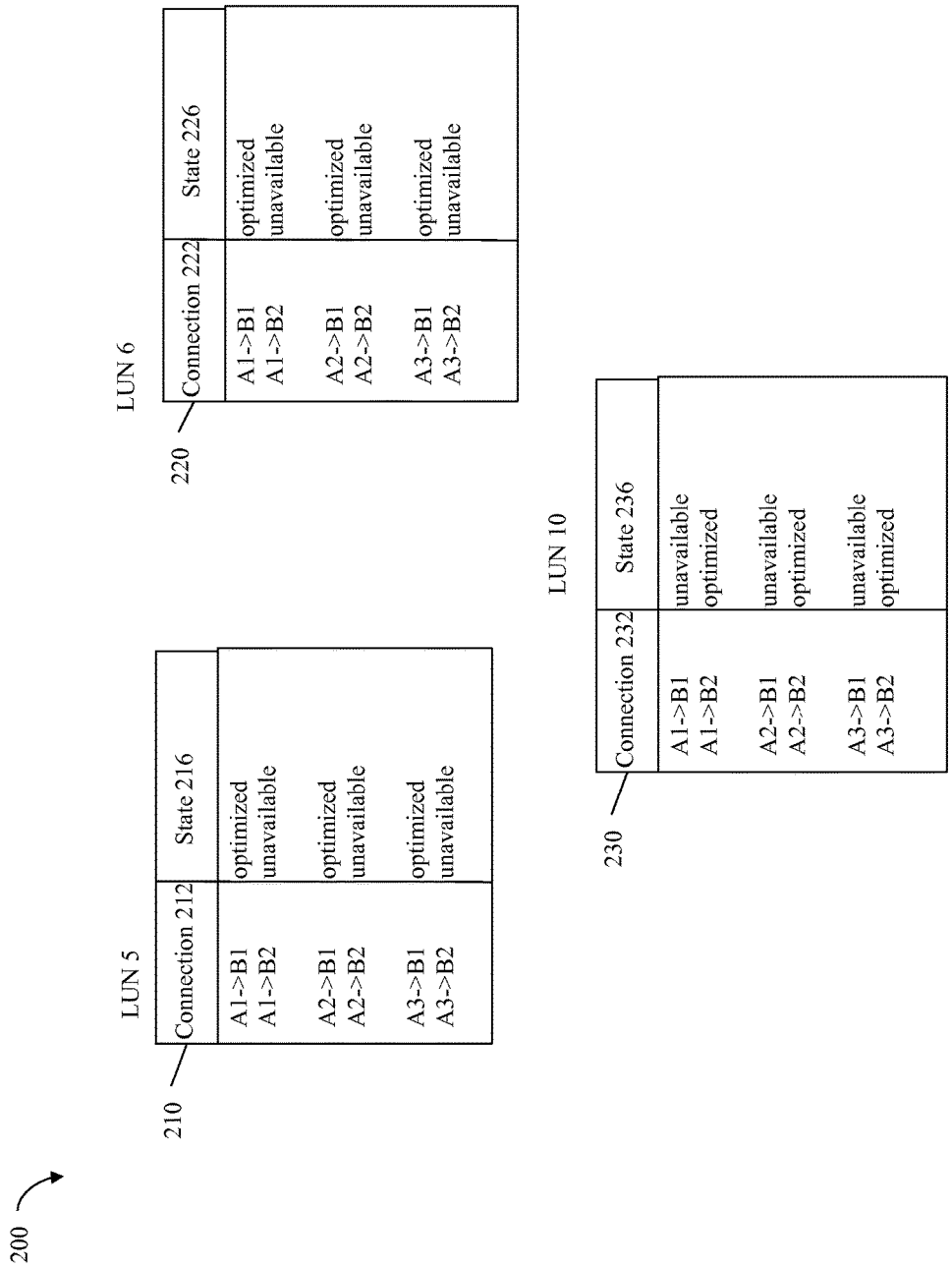
FIGS. 5, 6 and 7 are examples of connectivity information that may be used in illustrating embodiments of techniques herein.

Referring again back to FIG. 3, assume that for purposes of example and illustration at a first point in time, existing zoning and masking information indicates that each of LUNs 5, 6 and 10 are accessible to each of the initiators A1, A2 and A3 over each of the target ports B1 and B2. Existing masking information does not allow B3 to be used by any of the initiators A1, A2 and A3. Existing zoning information also does not allow connectivity between B3 and any of the initiators A1, A2 and A3. Furthermore, as described in more detail below in an embodiment in accordance with techniques herein, the access states associated with accessing each of the LUNs with respect to a particular initiator and particular target port may be used to dynamically control and distribute the workload from initiators A1, A2 and A3 directed to LUNs 5, 6 and 10 across target ports B1 and B2 of the data storage system 120. Referring to FIG. 5, shown is a representation of existing connectivity information currently defined for LUNs consistent with the above-mentioned example at the first point in time. The information in the example 200 may be referred to as a connectivity map or connectivity information detailing the current connectivity information with respect to host 102 and the data storage system 120.

Table 210 denotes the connectivity information with respect to LUN 5 and includes a first column of connections 212 and a second column of states 216. A row in table 210 indicates that, for the connection between the specified initiator and target port denoted in column 212, it associated access state with respect to LUN 5 is denoted in column 216. Based on the information in table 210 for LUN 5, I/Os may be issued to LUN 5 from each of the initiators A1, A2 and A3 only through target port B1. If any of the initiators A1-A3 sends an I/O to LUN 5 to target port B2, the I/O will not be serviced and result in an error.

Table 220 denotes the connectivity information with respect to LUN 6 and includes a first column of connections 222 and a second column of states 226. A row in table 220 indicates that, for the connection between the specified initiator and target port denoted in column 222, it associated access state with respect to LUN 6 is denoted in column 226. Based on the information in table 220 for LUN 6, I/Os may be issued to LUN 6 from each of the initiators A1, A2 and A3 only through target port B1. If any of the initiators A1-A3 sends an I/O to LUN 6 to target port B2, the I/O will not be serviced and result in an error.

Table 230 denotes the connectivity information with respect to LUN 10 and includes a first column of connections 232 and a second column of states 236. A row in table 230 indicates that, for the connection between the specified initiator and target port denoted in column 232, it associated access state with respect to LUN 10 is denoted in column 236. Based on the information in table 230 for LUN 10, I/Os may be issued to LUN 10 from each of the initiators A1, A2 and A3 only through target port B2. If any of the initiators A1-A3 sends an I/O to LUN 10 to target port B1, the I/O will not be serviced and result in an error.

In this example, I/Os from A1-A3 are directed to target ports B1 and B2. At the first point in time when the connectivity information of FIG. 5 is in effect, the observed or measured workload through each of the target ports B1 and B2 may be less than the specified workload threshold denoting that none of the target ports B1 and B2 is considered overloaded. As described elsewhere herein, if one or more target ports exceed their associated specified workload threshold, the target port may be considered overloaded and processing may be performed in accordance with techniques to redistribute or shift workload from the overloaded target port to another target port having available bandwidth. As described above, one technique that may be used to redistribute the workload includes updating masking information and then using TDZ to automatically make similar changes to zoning information.

Another condition that, when detected, may be cause for redistributing or shifting workload is an unbalanced workload. In one embodiment, it may be a goal or desire to have an approximately equal workload (within a specified threshold or tolerance) across the data storage system. Such a determination may be made with respect to any of target ports and HAs (e.g., front end adapters of the data storage system each including one or more target ports), or more generally, front end components of the data storage system. For example, whether workload of the data storage system is balanced may be made with respect to target ports that are currently zoned and masked for use by at least one initiator for at least one LUN.

Whether the workload is balanced may be determined with respect to one or more rebalancing criteria. For example, such criteria may include a specified threshold or tolerance denoting an acceptable level of difference or variation between observed workloads of the different target ports. To further illustrate with the current example using target ports B1 and B2, if the difference in workload between the two target ports exceeds the specified threshold or tolerance, then the current workload of the data storage system may be considered unbalanced and require redistribution to further more equally partition the workload between the two target ports B1 and B2. As a variation, if there were more than 2 target ports under consideration for workload balancing, an average workload across the target ports may be determined and the specified threshold may denote a difference from the average whereby if the observed workload of the target port is outside the range denoted by the average+/−threshold, the observed workload may be considered out of balance and workload may be shifted to the target port (e.g., if observed workload is less than average−threshold) or may be shifted from the target port (e.g., if observed workload is less than average+threshold). It should be noted that the threshold denoting an acceptable level of difference or variation with respect to the multiple ports under consideration may be identified in any suitable manner. For example, the threshold denoting an acceptable level of difference or variation may be specified as a number of standard deviations from the mean or average observed workload, may be expressed as a percentage of the mean or average workload, and the like.

In this example with reference to FIG. 5 at the first point in time, the observed workload W1 (denoting the sum or aggregate workload for LUNs 5 and 6) for target port B1 may be approximately the same as the observed workload W2 (denoting the workload for LUN 10) for target port B2. At the first point in time, assume the following workloads for each of the LUNs:

| workload | LUN |
|---|---|
| 100 IOPS | 5 |
| 100 IOPS | 6 |
| 200 IOPS | 10 |

At this first point in time, the observed workloads for target port B1=200 IOPS and for target port B2=200 IOPS and the current workload in the data storage system may be determined as balanced.

At a second later point in time, the total workload (e.g., in terms of I/Os per second and/or MBps) from A1-A3 directed to LUN 5 greatly increases, the total workload from A1-A3 directed to LUN 10 greatly decreases and the total workload from A1-A3 directed to LUN 6 also greatly increases. To further illustrate, at the second point in time, assume the following workloads for each of the LUNs:

| workload | LUN |
|---|---|
| 500 IOPS | 5 |
| 500 IOPS | 6 |
| 2 IOPS | 10 |

Figure 6:
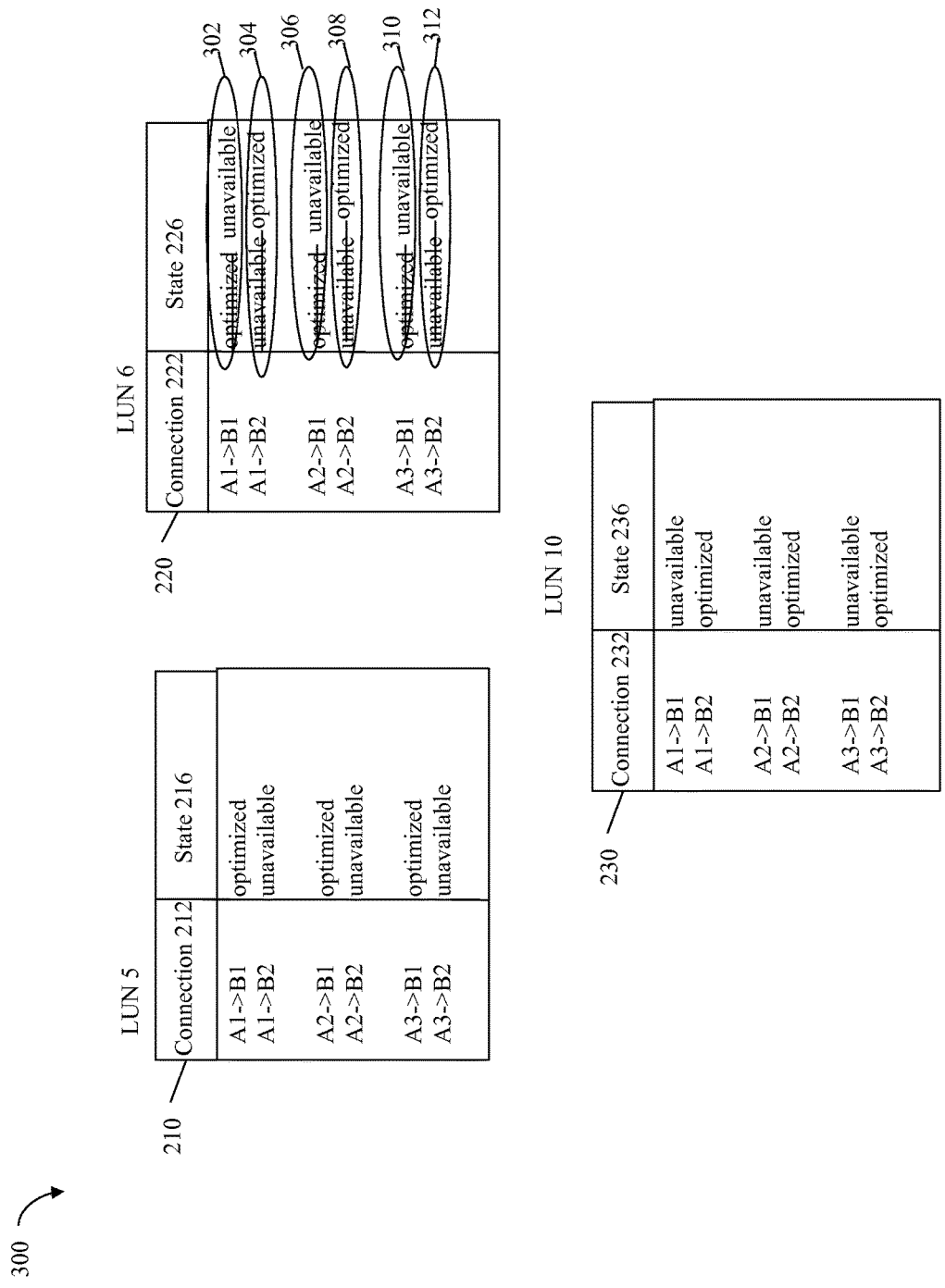

At this second point in time, the observed workloads for target port B1=1000 IOPS and for target port B2=2 IOPS and may be considered unbalanced since the difference in workloads between the 2 target ports exceeds a specified maximum difference threshold. Thus, processing may be performed to attempt to rebalance the existing workload across the target ports B1 and B2. In connection with this example having the connectivity information as in FIG. 5, processing may be performed in an embodiment in accordance with techniques herein to shift or redistribute the workload across target ports B1 and B2 by dynamically modifying one or more access states each associated with a particular LUN accessed by a particular initiator through a particular target port. Based on the above-noted workloads for the second point in time, it may be determined to redistribute the existing workload more evenly across target ports B1 and B2 by shifting the total workload of LUN 6 from B1 to B2. This redistribution may be accomplished by accordingly modifying access state information in column 226 of table 220 regarding LUN 6. Referring to FIG. 6, shown is an example 300 including an updated table 220 for LUN 6 to implement the redistribution of the workload of LUN 6 from B1 to B2. Elements 302, 304, 306, 308, 310 and 312 denote the modifications made to the connectivity information from FIG. 5. In particular, elements 302, 306, and 310 indicate that each of the associated access states for LUN 6 is modified from optimized to unavailable thereby making LUN 6 unavailable for I/Os over paths to LUN 6 including target port B1. Elements 304, 308, and 312 indicate that each of the associated access states for LUN 6 is modified from unavailable to optimized thereby making LUN 6 available for I/Os over paths to LUN 6 including target port B2.

Thus, without modifying existing zoning or masking information, the associated access states regarding LUN 6 over different paths may be modified to block or limit I/O access over particular combinations of initiators and target port B1. Also the associated access states regarding LUN 6 over different paths may be modified to allow I/O access over particular combinations of initiators and target port B2.

It should be noted that FIG. 6 illustrates modifying the access states with respect to all initiators A1-A3. It may be that the needed workload redistribution may be performed by modifying the states associated with LUN 6 with respect to less than all initiators. For example, workload monitoring may be performed on the data storage system which further monitors the workload at target port B1 per initiator per LUN. For example, such monitoring may determine that 95% of the workload directed to LUN 6 is from a single initiator such as A1. Rather than modify 6 access states in table 220 as illustrated in FIG. 6, the workload redistribution may be accomplished by only performing the 2 access state modifications denoted by elements 302 and 304.

In this manner, modifying an access state with respect to accessing a particular LUN by a particular initiator through a particular target port may be used as another technique to redistribute workload in an embodiment in accordance with techniques herein. Consistent with description elsewhere herein, modifying such access states may be one technique embodied in the optimization tool along with other features as described herein.

At a third point in time, assume that the workload directed to each of the LUNs 5, 6 and 10 continues to steadily increase so that each of the LUNs has a total workload from A1-A3 of 400 IOPS. At this point, the current workload of target port B1 is 800 IOPS (for LUNs 5 and 6) and the current workload of target port B2 is 400 IOPS. Assume that the workload threshold denoting the upper bound for the observed workload is 510 IOPS for both B1 and B2. Thus, at this third point in time, processing may determine that modifications to existing connectivity are needed to attempt to more evenly rebalance or distribute the workload on the data storage system. Additionally, processing may determine that modifications to existing connectivity are needed to alleviate the overloading on target ports B1. Additionally, although there is the option of redistributing the workload among any of the zoned target ports of B1 and B2, it may be the case that no remaining zoned ports are deemed suitable candidates to where the I/O workload may be shifted. For example, as in this case, the optimization tool may determine that all such remaining zoned ports collectively are not able to handle the workload (e.g., combined workload capacity of B1 and B2 without exceeding workload threshold is 1000 IOPS and the total aggregate observed workload for LUNs 5, 6 and 10 to be distributed over target ports B1 and B2 is 1200 IOPS. For example, simulating, modeling or estimating the resulting hypothetical workload of performing such a shift indicates that such zoned target ports B1 and B2 cannot handle the workload without also exceeding associated workload thresholds.

Figure 7:
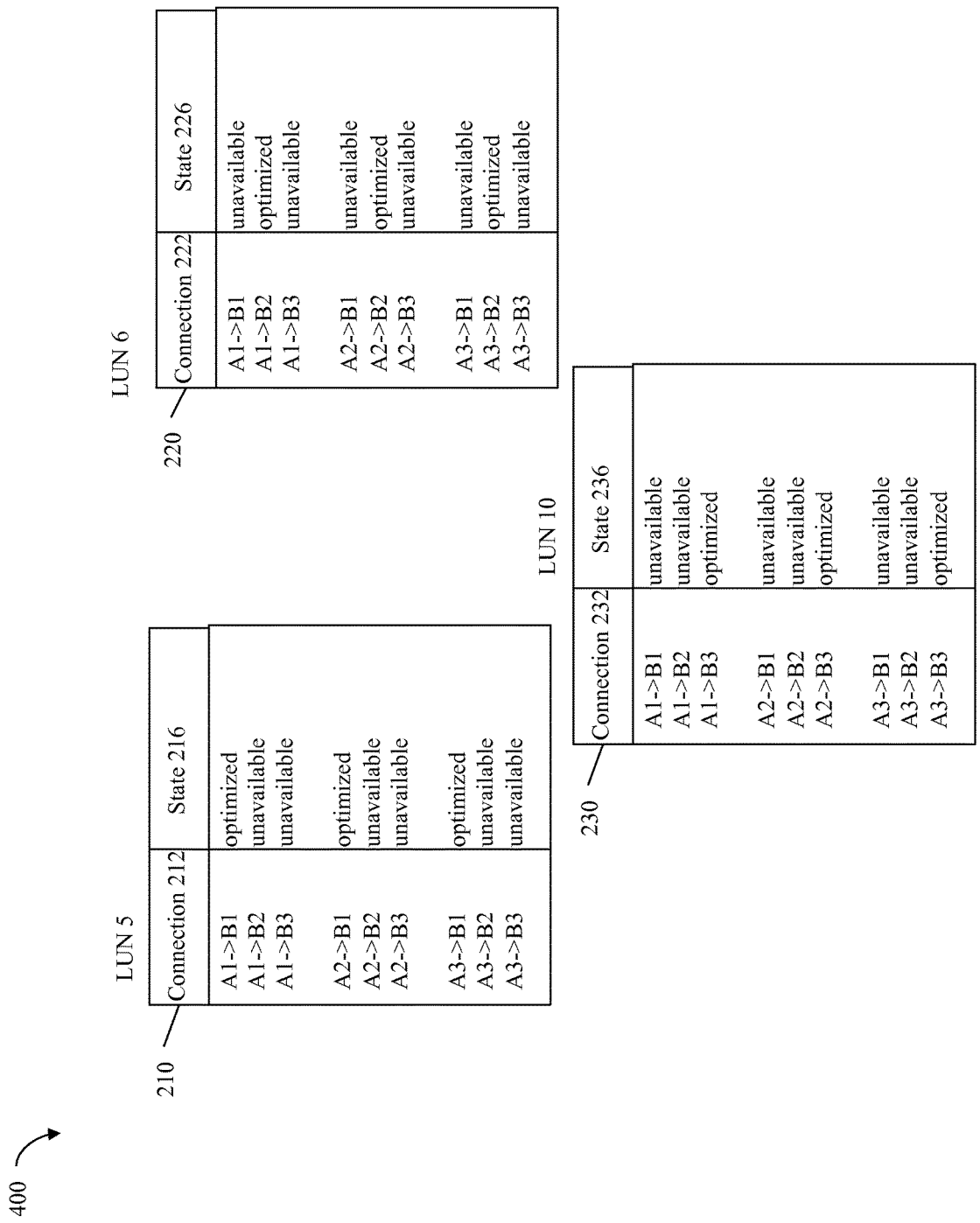

In this case, processing may expand the search for possible candidate target ports to take over the additional workload. Such processing may include determining whether there is another target port besides B1 and B2 on the data storage system available to handle a portion of the workload and thus be a candidate to which the portion of the workload is distributed. With reference to FIG. 3, target port B3 may be have an associated workload threshold of 500 IOPS similar to each of target ports B1 and B2. In this case, processing may be performed (such as by the optimization tool) to accordingly update the masking information associated with B3 to allow access to LUNs 5, 6 and 10 over target port B3 to any of the initiators A1-A3. As described elsewhere herein, the masking information specified on the data storage system may then be used by the data storage system with TDZ to rezone A1-A3 to also include B3. Additionally, processing may then be performed by the optimization tool to rebalance or redistribute the workload among now 3 target ports B1-B3. In this case, such processing may determine that the total workload for LUN 5 from A1-A3 should be distributed to B1, the total workload for LUN 6 from A1-A3 should be distributed to B2 and the total workload for LUN 10 should be distributed to B3. The latter rebalancing or redistribution of workload may be performed by accordingly setting the access states of existing connections as illustrated in FIG. 7. Thus, in one aspect, TDZ and zoning modifications may be characterized a coarser granularity of workload distribution and balancing control and LUN access state change may be characterized as a finer granularity of workload distribution and balancing control, as may be performed by an optimization tool in accordance with techniques herein.

It should be noted that although the foregoing is illustrated for purposes of simplicity with respect to a single host, techniques herein may generally be performed in connection with multiple hosts connected to the data storage system. Additionally, although only a single target port is included in each of the HAs (or more generally front end adapters) of the data storage system, more generally each HA may include one or more target ports. In such a case, workload and other information may be obtained for each target port as well as per HA (based on the aggregate workload of all target ports of the HA).

Figure 8:
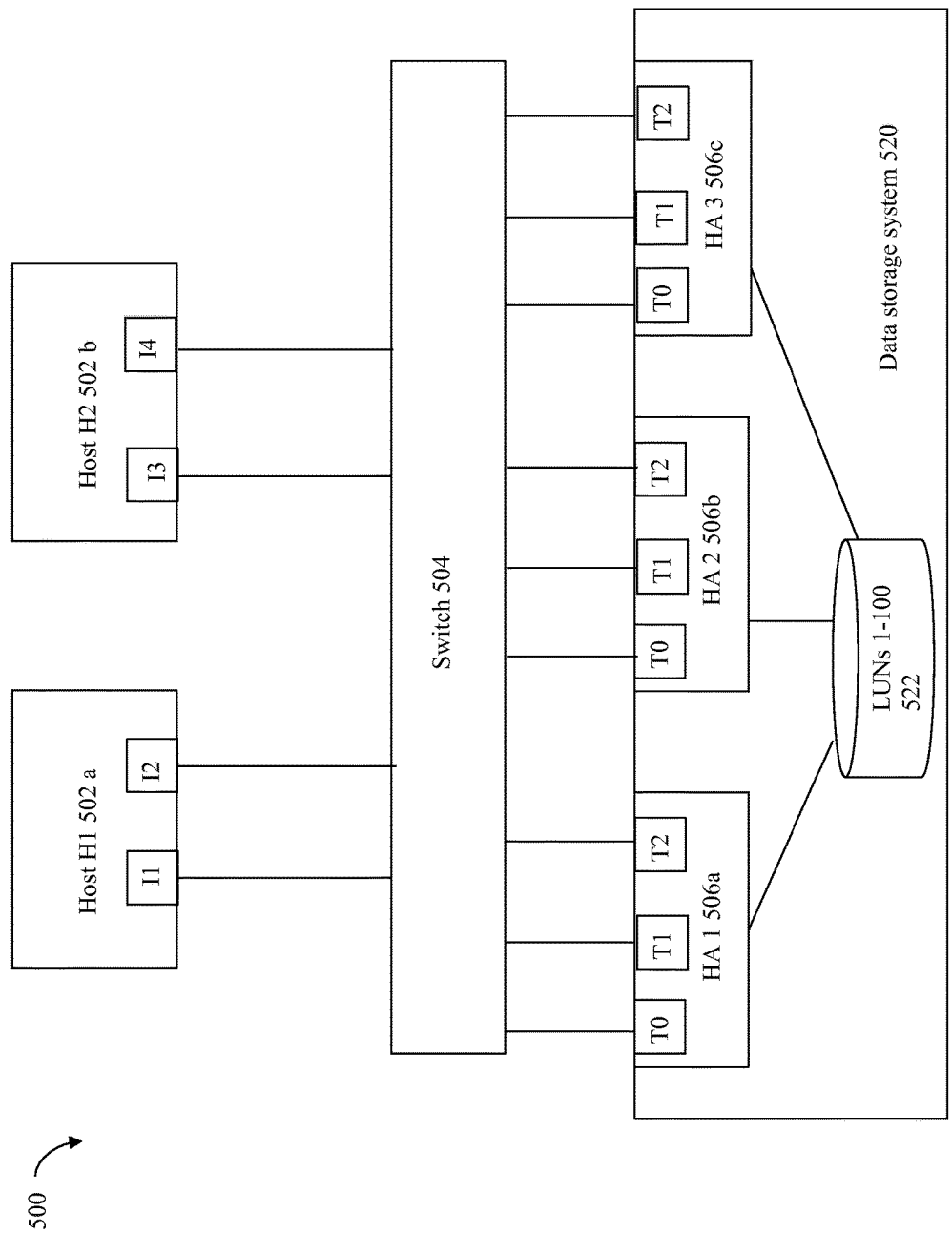

To further illustrate, reference is made to FIG. 8 which is an example of components that may be included in an embodiment in accordance with techniques herein. In the example 500, shown are hosts 502a-b, switch 504 and data storage system 520. Host 502a includes initiators I1 and I2 connected to the switch 504. Host 502b includes initiators I3 and I4 connected to the switch 504. Data storage system 520 includes HAs 506a-506c where each such HA includes 3 target ports denoted T0-T2. Each of the target ports T0-T2 of each of the HAs 506a-c is attached to physical storage for LUNs 1-100 522. Thus, the example 500 is a representation of components that may be used with techniques herein where each front end adapter such as HA of the data storage system 520 includes multiple target ports.

In this example, assume zoning information is defined such that a zone is defined where I1 is only zoned for HA 1 506a, ports T0 and T1. Assume also that is another zone defined where I3 is zoned only for HAL 506a, port T2. Furthermore masking information indicates that I1 can access LUNs 1-100 over only HA 1 506a, T0 and T1 and the access state is set to optimized with respect to I1 accessing LUNs 1-100 through target ports HA1 506a, T0 and T1. The masking information also indicates that I3 can access LUNs 1-100 over only target port T2 of HA 1 506a and the access state is set to optimized with respect to I3 accessing LUNs 1-100 through target port HA 1 506a, T2. Thus, I1 is currently issuing I/Os for 100 LUNs (e.g., LUNS 1-100) over a first path from I1 to T0 of HA 1 506a and over a second path from I1 to T1 of HA 1 506a. I2 is currently issuing I/Os for 100 LUNs (e.g., LUNS 1-100) over a path from I2 to T2 of HA 1 506a.

At a point in time, both target ports T0 and T1 of HA 1 506a become overloaded and there is no additional target port currently zoned for I1. Furthermore, such processing may also determine that HA1 506a as a single component (based on workload through all ports T0-T2 of HA 506a) is overloaded so that shifting workload to T2 of 506a is not an option. The optimization tool in an embodiment in accordance with techniques herein may perform processing that determines to shift the I/O workload for 50 of these LUNs (e.g., LUNs 1-50) from I1 to another target port of another HA, such as port T0 of HA 2 506b. At this point, the optimization tool may perform processing as described herein to modify the masking information to indicate that I1 is allowed access to LUNs 1-100 over port T0 of HA 2 506b and further reconfigure the zone for I1 using TDZ to also include HA 2 506b, target port T0. The optimization tool may then also modify associated access states regarding I's access of the LUNs 1-100 exposed over HA1 506a, target ports T0, T1, and HA 2, 506b, target port 0. In this example, the optimization tool may set the access state for I1 accessing LUNs 1-50 over HA 1 506a, target ports T0 and T1 to unavailable and may set the access state for I1 accessing LUNs 51-100 over HA 2 506b, target port T1 to optimized to appropriately distribute the workload from I1 to LUNs 1-100 over the zoned target ports HA1 506a, T0 and T1, and HA 2 506b, T0.

Thus, an embodiment in accordance with techniques herein may use the masking information and TDZ to expand, or more generally, modify the set of potential rebalancing target port candidates accepting the redistributed or donated I/O workload. Processing may then be performed to select a target port from such set of updated potential target port candidates. In other words, an embodiment in accordance with techniques herein may, for example, use TDZ to make additional bandwidth or capacity of the candidate target ports available for consumption to accept donated I/O workload. An embodiment may further shift or balance I/O workload to particular candidate target ports by modifying appropriate access states.

Consistent with description herein, use of masking information and zoning, such as using TDZ, may be characterized as providing a set of connections or paths (from initiators to targets) over which I/O workload may potentially flow to particular LUNs exposed over target ports of the connections. Setting the access state with respect to a particular LUN exposed over a particular target port to a particular initiator may be used to control (e.g., balance, redistribute) the flow of I/Os through such a defined set of connections or paths. When an existing set of defined connections or paths does not have available capacity or bandwidth to handle the total I/O workload directed over them, modifying masking information and implementing the masking modification using TDZ may be used to further modify the set of connections (and thus potential target ports available for selection) where the resulting set may have a larger available bandwidth or capacity to handle the total I/O workload. Setting the access state with respect to a particular LUN exposed over a particular target port to a particular initiator may be used to control (e.g., balance, redistribute) the flow of I/Os through the resulting set of modified connections or paths between initiators and targets.

An embodiment in accordance with techniques herein may generally perform processing to determine whether to modify existing connectivity between initiators and target ports of the data storage system. The modification may include modifying one or more associated access states such as illustrated in connection with FIGS. 5 and 6. The modification may include modifying masking and zoning information as also noted above. In connection with this latter modification, masking information on the data storage system may be modified (such as using data storage system management software) and then the data storage system may automatically perform processing using TDZ to have such modifications (that were made to the masking information) also implemented in the zoning information.

Whether to modify existing connectivity between initiators and targets may utilize one or more adjustment criteria. The adjustment criteria may include, for example, the workload threshold as described above which denotes an upper bound on the observed workload such as with respect to a target port. Thus, such a modification may be made responsive to determining, for example, that a target port is overloaded. The adjustment criteria may also include one or more rebalancing criteria which identify when workload on the data storage system may be considered unbalanced and need redistribution.

In at least one embodiment, use of techniques as described herein may be embodied in software or executing code, such as an optimization tool or application. The optimization tool may receive workload information regarding the workload of the various front end components such as target ports and HAs of the data storage system. The workload information may be I/O workload information expressed in one or more suitable I/O statistics or metrics (e.g., IOPS, MBps) such as mentioned elsewhere herein. Another workload metric that may be obtained and used in connection with techniques herein is utilization. Utilization may be expressed as a percentage with respect to a component's maximum capacity or capability (e.g., saturation point) For example, as mentioned elsewhere herein, a target port may have a maximum workload capacity (e.g., such as expressed in terms of IOPS, MBps, and the like) where the foregoing denotes 100% utilization of the target port. If a current workload for the target port is 50 IOPS and the maximum workload capacity for the target port is 100 IOPS, the target port may be at 50% utilization. In a similar manner, a single HA may have a maximum workload capacity (e.g., such as expressed in terms of IOPS, MBps, and the like) where the foregoing denotes 100% utilization of the HA. If a current workload for the HA (as determined based on the aggregate workload of all its target ports) is 500 IOPS and the maximum workload capacity for the target port is 1000 IOPS, the HA may be at 50% utilization. As mentioned elsewhere herein, a threshold denoting a maximum or acceptable upper bound regarding workload may be specified per target port and also per HA.

The optimization tool may also receive performance information regarding I/O performance such as with respect to I/Os that are received at a particular target port, particular HA, per LUN, and/or per initiator. The performance information may include any one or more suitable performance metrics or statistics such as average response time (RT) for an I/O. It should be noted that workload and/or performance information may be obtained at varying levels of granularity (e.g., such as what is the workload and performance with respect to I/Os of a LUN at each target port/on a per target port basis; or what is the workload and performance with respect to I/Os of a LUN sent from a particular initiator at each target port/on a per target port basis).

The optimization tool may receive information regarding the current state of the data storage system, such as observed current workload and/or performance information. Additionally, the optimization tool may receive information regarding the current access state settings with respect to initiators accessing various LUNs over exposed target ports. For example, the optimization tool may use such access state information to determine at a point in time which initiator(s)/host are issuing I/Os over particular paths in accordance with associated access states set to optimized. Thus, the optimization tool may receive inputs including workload and/or performance information and current access state settings. The optimization tool may use such inputs, for example, in determining whether to modify existing connectivity information. Modifications may include any of automatically modifying one or more access states and automatically modifying zoning information. Such modifications may be needed if workload is unbalanced, if workload of a component is overloaded, if performance is unacceptable, and the like. For example, a modification to existing connectivity information may be made if it is determined that a target port or HA is overloaded, and/or I/O performance (such as for a particular LUN) is less than a specified performance threshold.

The one or more inputs related to workload and/or performance information may include current observed values for one or more metrics or statistics regarding workload and/or performance as well as one or more predicted values for one or more metrics or statistics regarding workload and/or performance. The one or more inputs related to workload and/or performance information may relate to trends or a history regarding workload and/or performance. The one or more inputs may also relate to scheduled activities or events which may affect workload and/or performance of the data storage system. For example, such scheduled items may include a scheduled backup where it may be desirable to ensure available bandwidth of target ports, HAs, etc. to handle the increased workload expected due to the backup operation where data is being backed up to LUNs of the data storage system. Another example of a scheduled item may related to a scheduled decommissioning or removal/replacement of components from the data storage system such as a scheduled replacement of one or more HAs in the data storage system.

Following paragraphs set forth additional detail regarding processing, features and inputs that may be used in connection with an embodiment of an optimization tool in accordance with techniques herein. In at least one embodiment, the optimization tool may perform the following:

a) Collect performance and workload information regarding front end components of the data storage system. Such information may be collected per target port, per HA, regarding individual LUNs on each of the various target ports over which such LUNs are accessible. The performance and workload information collected may be used as an input into decision making performed in subsequent steps such as deciding whether to modify connectivity information due to unbalanced workload distribution on the data storage system, overloaded component(s), and the like. For example, the performance and workload information collected may be used in deciding what workload (e.g., I/Os directed to which one or more LUNs) to be relocated/moved/redistributed and also where (e.g., which target port or target HA) to move the workload.

It should be noted that the performance and workload information may include collecting various statistics or indicators some of which are described herein. For example, an embodiment may collect one or more key performance indicators (KPIs) such as KPIs per HA port and KPIs per HA (e.g., I/Os per second per port, MB per second per port, HA CPU load (32 ports in an HA therefore load for the entire FA considers one or more KPIs for all 32 ports)). The KPIs may also be collected per logical device (e.g., per LUN) on a particular HA port (e.g., I/Os per second directed to a particular LUN at a particular HA port, MBs per second directed to a particular LUN at a particular HA port, in order to denote how much load/work each LUN contributes to the overall port workload). An embodiment may also collect information on other KPIs, such as, for example, any one or more of: average I/O size per LUN, and overall average I/O latency (e.g., I/Os sometimes take longer because such I/O may be sent to a remotely located data storage system which therefore increase the overall I/O latency on a particular HA port). An embodiment may generally use any one or more suitable KPIs such as one or more of the foregoing as well as other described herein.

b) Predict workload and/or performance of one or more target ports and/or one or more HAs. For example, in one embodiment where the workload information includes utilization such as described elsewhere herein, a predicted utilization may be determined for each target port and each HA. An embodiment may generally use any suitable prediction algorithm or technique known in the art. For example, in at least one embodiment, the time series Holt Winters algorithm or forecasting method may be used. Such prediction may make such a prediction regarding workload and/or performance values and take into account one or more factors such as trending, seasonality and exponential smoothing.

c) Perform processing to determine if the workload distribution is balanced across the array based on current workload and/or predicted workload (such as for the next subsequent time period). Such a determination may be made with respect to HAs, target ports and/or LUNs. Some examples are provided elsewhere herein such as with respect to workload balancing across target ports and/or HAs. For example, it may be a goal of workload balancing and distribution to have approximately (e.g., within a specified threshold) the same workload and/or performance (e.g., such as with respect to average I/O RT) on all HAs and across all FA ports. If not, then processing may be performed to try and achieve this goal by relocating load from a busy HA or target port having a high workload to an idle or less busy HA or target port. Such relocation or redistribution may be performed automatically using techniques as described elsewhere herein by modifying existing connectivity, for example, by modifying one or more access states, alone or in combination with, modifying zoning information using TDZ. An embodiment may generally use any suitable algorithm or technique known in the art to determine whether workload distribution such as with respect to target ports, HAs and/or LUNs is balanced, or otherwise requires redistribution. For example, an embodiment may use an algorithm characterized as a naïve algorithm. Generally, this class of algorithms may perform processing to ensure that all HA port and HAs have the same workload, within some specified tolerance. A disadvantage of such algorithms may be that they are reactive and may cause thrashing whereby host or incoming I/O workload may be shifted rapidly between different ports or HAs without having a chance to obtain any benefit of the workload shift. An embodiment may also use an algorithm classified as a proactive algorithm which may use a technique of a naïve algorithm with additional factors and/or processing to look for patterns in the workload in order to predict future high and/or low loads, as well detect anomalies. (As mentioned elsewhere herein, an anomaly is when there is a spike in the workload for a very short insignificant amount of time and it is therefore deemed no worth taking any action responsive to such anomalies to move workload between other HA ports/HAs). For example, an embodiment may use an algorithm characterized as a time-series analysis algorithm which take into account pattern detection and also a correlation between a current workload and one or more prior workloads.

d) Use an anti-thrashing mechanism to prevent continuous redundant changes. Generally, it may not be desirable to thrash back and forth making a change and then undoing the change. For example, if it is known that an increased workload directed to a particular set of LUNs is expected at both 8 am and 10 am, an embodiment may not want to reduce allocated resources (e.g., may not want to decrease number of optimized access states of target ports) for servicing I/Os for the set of LUNs at 9 a.m. even though I/O workload is expected to decrease at 9 am. Thus, as an anti-thrashing mechanism, an embodiment may consider an amount of time between scheduled, expected and/or predicted workload changes regarding resource allocation or changing I/O workload. For example, an embodiment may not want to make a change to decrease resources as in the foregoing example unless the lowered I/O workload has been maintained, or is expected/predicted to be maintained, for a specified period of time.

e) Consider a minimum event duration time before taking a responsive action to make a change to existing connectivity. An embodiment may take as an input the minimum event duration time that indicates the minimum amount of time an observed change (e.g., increase or decrease in workload) occurs before responsive steps may be taken/before recognizing this event as an occurrence that is significant/of interest for which processing may be performed (e.g., such as a response or action in connection with techniques herein). For example, an increased or decreased workload for a time period of 1 second may be less than the minimum amount of time specified in an embodiment for recognizing such an occurrence as an event of interest for which processing may be performed in accordance with techniques herein, such as to accordingly adjust resources currently allocated to handle the increased or decreased workload. Alternatively, an increase or decrease in workload for a time period of 1 hour may exceed the minimum amount of time specified in an embodiment for recognizing such an occurrence as an event of interest for which processing may be performed in accordance with techniques herein, such as to accordingly adjust resources currently allocated to handle the increased or decreased workload, recognize the event occurrence as part of history or trend, and the like.

f) Use an anomaly detection algorithm to verify that a change in workload is within normal or expected boundaries whereby the workload change is not considered an anomaly. Such techniques may be used to avoid making any modification to existing connectivity to redistribute workload responsive to an anomaly. Such anomaly detection techniques may assist in identifying transient event occurrences which should not be considered part of a pattern, trend or history with respect to workload and/or performance. As an example of a transient event that may be considered an anomaly, consider when a new host is connected to a network, such as a SAN. The host may perform discovery processing to discover various network entities which results in a large number of I/Os. Anomaly detection may facilitate identifying such an event occurrence as an anomaly to be ignored since it is not a regular occurring event. Generally, an anomaly may be an isolated infrequent occurrence of a change in I/O workload. Such occurrences may also be random and not predictable. In this case, such anomalies may be identified and ignored. As an example of an anomaly detection technique that may be used in an embodiment in accordance with techniques herein, observed data, such as regarding workload and/or performance may be collected for a time period for an HA and its associated ports, for a particular LUN whose I/Os are received at various target ports, and the like. From such historic observed data over a time period, current collected data regarding workload and/or performance may be compared to determine whether an observed change in workload and/or performance is an anomaly. An embodiment may generally use any suitable algorithm or technique known in the art to determine or detect anomalies. For example, an embodiment may use an algorithm characterized as a proactive algorithm such as one based on a time-series analysis as described elsewhere herein.

g) Create an updated set of connectivity information in response to determining there is an imbalance and/or overload. For example, FIG. 5 includes an example of a first set of connectivity information or connectivity mapping at a first point in time which may be modified to a second set of connectivity information or connectivity mapping at a second point in time such as illustrated in FIG. 6. The updated set of connectivity information may be determined taking into account current and/or future predicted workloads (e.g., prepare for known expected event occurrence of a change in workload such as period of increased or decreased workloads based on history or patterns).

As described herein, the updated set of connectivity information may be implemented automatically using TDZ (e.g., to implement zoning changes) and/or modifying one or more access states with respect to a particular initiator accessing a particular LUN exposed over a particular target port. For example, as discussed elsewhere herein, with respect to a particular LUN and a particular initiator, setting an access state to optimized at a first set of one or more target ports and unavailable at a second set of one or more target ports results in the initiator only issuing I/Os to the LUN over paths including a target port of the first set having an associated optimized access state.

An embodiment in accordance with techniques herein may periodically (e.g., such at every occurrence of a specified amount of time) perform processing as described herein to determine whether any changes to connectivity information are needed due to workload imbalances, overloaded components, and/or performance goal not being met.

It should be noted that the optimization tool or application embodying techniques described herein may be located on the data storage system, or at another suitable location or component external to the data storage system so long as the appropriate information can be collected to perform the analysis and processing as described herein.

Figure 9:
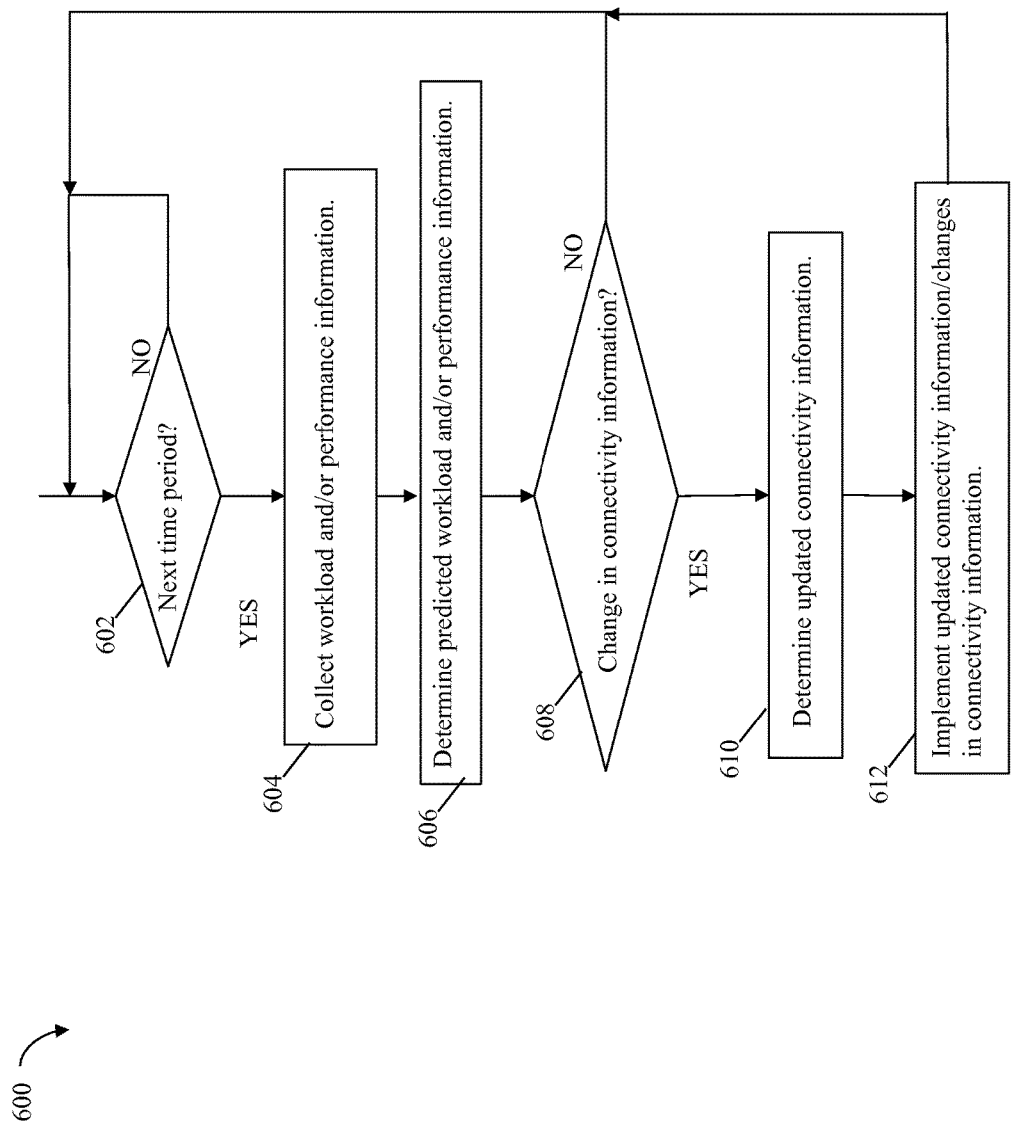
FIG. 9 is a flowchart of processing steps that may be performed in an embodiment in accordance with techniques herein.

Referring to FIG. 9, shown is a flowchart of processing steps that may be performed in an embodiment in accordance with techniques herein. The flowchart 600 summarizes processing as described above. At step 602, a determination is made as to whether a next time period has occurred such as to result in performing subsequent processing steps on a periodical basis. Control remains at step 602 until step 602 evaluates to yes. If step 602 evaluates to yes, control proceeds to step 604 to collect workload and/or performance information. At step 606, processing may be performed to determine predicted workload and/or performance information. At step 608, a determination is made as to whether a change in existing connectivity information is needed. As described above, such a change may be needed due to due to any of: a workload imbalance, an overloaded component, and a specified level of performance not being met. Step 608 may be performed in accordance with one or more inputs including, for example, the observed workload and/or performance information collected in step 604, the predicted workload and/or performance information from step 606, any information related to historical observed data (e.g., trends), future scheduled activities or events affecting workload and/or performance, and the like. The one or more inputs may also include one or more adjustment criteria used to generally denote criteria used to determine, for example, whether there is a workload imbalance, whether one or more front end components (e.g., target ports or HAs) of the data storage system are overloaded, and whether a specified level of performance (e.g., such as with respect to I/Os directed to a LUN) is being met. Such one or more adjustment criteria may be used to determine whether a change or modification to connectivity information is needed due to a need to redistribute workload (e.g., among the front end components of the data storage system). As described elsewhere herein, the one or more adjustment criteria may include, for example, one or more workload thresholds denoting maximum workloads for target ports and HAs, one or more performance thresholds denoting acceptable levels of performance such as for I/O directed to LUNs, and one or more rebalancing criteria (e.g., used to determine if current workload is unbalanced such as with respect to target ports, HAs, and/or LUNs). If step 608 evaluates to no, control proceeds to step 602 to wait for the next time period occurrence. If step 608 evaluates to yes, control proceeds to step 610 to determine the updated connectivity information. Step 610 may include determining whether existing connectivity information includes a number of target ports and/or HAs having sufficient capacity to handle current and/or predicted workload and to also meet an specified performance thresholds. If not, as described herein, step 610 may include increasing available workload capacity such as by zoning in one or more additional target ports for use by one or more initiators and then distributing workload with respect to options including the one or more additional target ports. At step 612, processing may be performed to implement the updated connectivity information or rather implement the changes that have been made to the connectivity information. As described herein, step 612 may include using TDZ (e.g., to implement zoning changes) and/or modifying one or more access states with respect to a particular initiator accessing a particular LUN exposed over a particular target port. From step 612, processing proceeds to step 602.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:
1. A method of determining connectivity comprising:
receiving, using a processor, one or more statistics regarding one or more components of a data storage system, said one or more components including any of a target port, a front end adapter, and a device;
determining, in accordance with a set of inputs and using a processor, whether to redistribute workload in the data storage system by modifying existing connectivity between an initiator set of one or more initiators and a target set of one or more target ports of the data storage system, the set of inputs including the one or more statistics and one or more adjustment criteria, wherein the set of inputs includes a minimum event duration time and wherein said determining includes:

determining whether a detected change related to at least one of workload and performance, with respect to the existing connectivity, occurs for at least the minimum event duration time; and responsive to determining the detected change does not occur for at least the minimum event duration time, determining not to modify the existing connectivity due to the detected change; and responsive to determining to modify the existing connectivity between the initiator set and the target set, performing first processing using a processor, wherein the first processing makes one or more modifications to the existing connectivity between the initiator set and the target set, wherein the modifications include:

modifying a state associated with a first target port of the target set over which a first device is exposed to a first initiator, wherein the first initiator is included in a host that recognizes a path to the first device from the first initiator to the first target port, and wherein the state indicates whether I/Os, that are directed to the first device and that are sent by the first initiator over the path to the first target port, are allowed to be issued to access data of the first device; and adding or removing connectivity between the first initiator and another target port of the data storage system where a device is exposed to the first initiator over the another target port.

2. The method of claim 1, wherein the state is modified from a first state to a resulting state, wherein the first state indicates that read and write I/Os that are directed to the first device and are sent by the first initiator to the first target port are serviced and wherein the resulting state indicates that read and write I/Os that are directed to the first device and are sent by the first initiator to the first target port are not serviced.

3. The method of claim 1, wherein the state is modified from a first state to a resulting state, wherein the first state indicates that read and write I/Os that are directed to the first device and are sent by the first initiator to the first target port are not serviced and wherein the resulting state indicates that read and write I/Os that are directed to the first device and are sent by the first initiator to the first target port are serviced.

4. The method of claim 1, wherein the one or more modifications includes adding the connectivity between the first initiator and the another target port of the data storage system where the device is exposed to the first initiator over the another target port.

5. The method of claim 4, wherein the one or more modifications includes setting a second state associated with the another target port over which the device is exposed to the first initiator, wherein the second state indicates whether or not read and write I/Os that are directed to the device and are sent by the first initiator to the another target port are serviced.

6. The method of claim 5, wherein the first processing adds the connectivity between the first initiator and the another target port over which the first device is exposed by communicating with any of a network fabric and connectivity fabric of a first component external to the data storage system and using masking information of the data storage system, the masking information including information indicating that the first device is exposed to the first initiator over the another target port.

7. The method of claim 6, wherein the first processing includes:

adding the first initiator to a storage group including the first device exposed over the another target port, wherein said adding updates the masking information to indicate that the first device is exposed over the another target port to the first initiator; and issuing a request to the first component in accordance with the masking information that creates a new zone including the first initiator and the another target port.

8. The method of claim 7, wherein the adding is performed using data storage management software of the data storage system and wherein the another target port issues the request that creates the new zone.

9. The method of claim 5, wherein the second state is set by the data storage system and affects whether or not the data storage system services read and write I/Os that are directed to the device and received by the another target port from the first initiator.

10. The method of claim 1, wherein the set of statistics includes at least one statistic regarding any of workload and performance of the one or more components.

11. The method of claim 1, wherein the one or more adjustment criteria includes any of: a minimum performance threshold, a maximum workload threshold, one or more rebalancing criteria identifying conditions when workload is considered unbalanced in the data storage system whereby redistribution of workload is performed, and a planned or scheduled activity or event in the data storage system requiring redistribution of workload.

12. The method of claim 11, wherein the one or more adjustment criteria indicates to modify the existing connectivity if any of: an observed performance value indicates current performance is less than a minimum performance threshold, an observed workload is more than the maximum workload threshold, the one or more rebalancing criteria indicates workload is currently unbalanced and needs redistribution, a predicted performance value indicates that predicted performance is less than the minimum performance threshold, a predicted workload is more than the maximum workload threshold, and the one or more rebalancing criteria indicates predicted workload for the one or more components is unbalanced and needs redistribution.

13. The method of claim 12, wherein a first of the one or more statistics denotes any of an observed workload value and an observed performance value for a first of the one or more components, and said determining whether to modify existing connectivity includes any of modeling and predicting the first statistic regarding the first component to determine a first predicted value, wherein said determining uses the first statistic and the first predicted value in connection with the one or more adjustment criteria to determine whether to modify existing connectivity.

14. The method of claim 13, wherein said determining includes performing anomaly detection to determine whether any of: a change between two consecutive observed values for one of the statistics and a change between the first statistic and the first predicted value is an anomaly that should be ignored.

15. The method of claim 1, wherein the set of inputs includes information regarding any of detected trends and patterns regarding any of workload and performance for the one or more components, and an activity history regarding any of workload and performance for the one or more components.

16. The method of claim 1, wherein the target set includes a plurality of target ports and wherein the data storage system includes a plurality of front end adapters each including one or more of the target ports, and wherein the method includes:
 determining a plurality of predicted workloads for any of the plurality of target ports and the plurality of front end adapters, wherein the plurality of predicted workloads are determined using inputs including a plurality of current workloads for the any of the plurality of target ports and the plurality of front end adapters, wherein the one or more adjustment criteria include one or more rebalancing criteria and the one or more inputs include the plurality of predicted workloads, and wherein said determining whether to modify the existing connectivity includes:
 determining whether workload distribution in the data storage system is balanced using the one or more rebalancing criteria and any of the plurality of predicted workloads and the plurality of current workloads.

17. The method of claim 16, wherein said determining whether to modify the existing connectivity includes:
 determining that at least one of the plurality of target ports and the plurality of front end adapters each have an associated workload exceeding a specified maximum threshold; and
 determining that workload capacity of the existing connectivity needs to be increased; and wherein said first processing includes:
 adding other connectivity to the existing connectivity, wherein said adding includes adding at least one target port to the target set by creating one or more new zones each including at least one initiator of the initiator set, each of said one or new zones being created by the data storage system automatically issuing requests to any of a network fabric and a connectivity fabric.

18. A system comprising:
 a processor; and
 a memory including code stored thereon that, when executed, performs a method of determining connectivity comprising:
 receiving one or more statistics regarding one or more components of a data storage system, said one or more components including any of a target port, a front end adapter, and a device;
 determining, in accordance with a set of inputs, whether to redistribute workload in the data storage system by modifying existing connectivity between an initiator set of one or more initiators and a target set of one or more target ports of the data storage system, the set of inputs including the one or more statistics and one or more adjustment criteria, wherein the set of inputs includes a minimum event duration time and wherein said determining includes:
 determining whether a detected change related to at least one of workload and performance, with respect to the existing connectivity, occurs for at least the minimum event duration time; and
 responsive to determining the detected change does not occur for at least the minimum event duration time, determining not to modify the existing connectivity due to the detected change; and
 responsive to determining to modify the existing connectivity between the initiator set and the target set, performing first processing using a processor, wherein the first processing makes one or more modifications to the existing connectivity between the initiator set and the target set, wherein the modifications include:
 modifying a state associated with a first target port of the target set over which a first device is exposed to a first initiator, wherein the first initiator is included in a host that recognizes a path to the first device from the first initiator to the first target port, and wherein the state indicates whether I/Os, that are directed to the first device and that are sent by the first initiator over the path to the first target port, are allowed to be issued to access data of the first device; and
 adding or removing connectivity between the first initiator and another target port of the data storage system where a device is exposed to the first initiator over the another target port.

19. A non-transitory computer readable medium comprising code stored thereon that, when executed, performs a method of determining connectivity comprising:
 receiving one or more statistics regarding one or more components of a data storage system, said one or more components including any of a target port, a front end adapter, and a device;
 determining, in accordance with a set of inputs, whether to redistribute workload in the data storage system by modifying existing connectivity between an initiator set of one or more initiators and a target set of one or more target ports of the data storage system, the set of inputs including the one or more statistics and one or more adjustment criteria, wherein the set of inputs includes a minimum event duration time and wherein said determining includes:
 determining whether a detected change related to at least one of workload and performance, with respect to the existing connectivity, occurs for at least the minimum event duration time; and
 responsive to determining the detected change does not occur for at least the minimum event duration time, determining not to modify the existing connectivity due to the detected change; and
 responsive to determining to modify the existing connectivity between the initiator set and the target set, performing first processing using a processor, wherein the first processing makes one or more modifications to the existing connectivity between the initiator set and the target set, wherein the modifications include:
 modifying a state associated with a first target port of the target set over which a first device is exposed to a first initiator, wherein the first initiator is included in a host that recognizes a path to the first device from the first initiator to the first target port, and wherein the state indicates whether I/Os, that are directed to the first device and that are sent by the first initiator over the path to the first target port, are allowed to be issued to access data of the first device; and
 adding or removing connectivity between the first initiator and another target port of the data storage system where a device is exposed to the first initiator over the another target port.

\* \* \* \* \*